US011978280B2

(12) United States Patent
Sun et al.

(10) Patent No.: US 11,978,280 B2
(45) Date of Patent: May 7, 2024

(54) METHOD AND DEVICE FOR EVALUATING EFFECT OF CLASSIFYING FUZZY ATTRIBUTE

(71) Applicant: Lemon Inc., Grand Cayman (KY)

(72) Inventors: Jingna Sun, Beijing (CN); Peibin Chen, Beijing (CN); Weihong Zeng, Beijing (CN); Xu Wang, Beijing (CN); Jing Liu, Los Angeles, CA (US); Chunpong Lai, Los Angeles, CA (US); Shen Sang, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 197 days.

(21) Appl. No.: 17/529,192

(22) Filed: Nov. 17, 2021

(65) Prior Publication Data

US 2023/0033303 A1 Feb. 2, 2023

(30) Foreign Application Priority Data

Jul. 30, 2021 (CN) .......................... 202110869963.5

(51) Int. Cl.
*G06K 9/46* (2006.01)
*G06F 18/21* (2023.01)
(Continued)

(52) U.S. Cl.
CPC ........ *G06V 40/172* (2022.01); *G06F 18/2113* (2023.01); *G06F 18/217* (2023.01); *G06F 18/22* (2023.01); *G06F 18/2431* (2023.01)

(58) Field of Classification Search
CPC .. G06V 40/172–40/173; G06V 10/98–10/993; G06F 18/30–18/41
See application file for complete search history.

(56) References Cited

U.S. PATENT DOCUMENTS

| 10,719,301 B1 * | 7/2020 | Dasgupta ............. G06V 10/774 |
| 2017/0286759 A1 | 10/2017 | Yao et al. |
| 2019/0188458 A1 * | 6/2019 | Kang .................... G06V 10/761 |

FOREIGN PATENT DOCUMENTS

| CN | 108205661 A | 6/2018 |
| CN | 108664924 A | 10/2018 |
| CN | 109492529 A | 3/2019 |

OTHER PUBLICATIONS

Robert Susmaga, "Confusion Matrix Visualization", pp. 107, printed in "Intelligent Information Processing and Web Mining" Proceedings of the International IIS: IIPWM'04 Conference held in Zakopane, Poland, May 17-20, 2004, Springer, bib and table of contents pp. 1-14 and article pp. 107-116. (Year: 2004).*

(Continued)

*Primary Examiner* — Brian Werner
(74) *Attorney, Agent, or Firm* — Faegre Drinker Biddle & Reath LLP (57) ABSTRACT

A method is provided for evaluating an effect of classifying a fuzzy attribute of an object, the fuzzy attribute referring to an attribute, a boundary between two similar ones of a plurality of categories of which is blurred, wherein the method includes: generating a similarity-based ranked confusion matrix, which comprises: based on similarities of K categories of the fuzzy attribute of the object, ranking the K categories, where K is an integer greater than or equal to 2, generating a K×K all-zero initialization matrix, wherein an abscissa and an ordinate of the initialization matrix respectively represent predicted values and true values of the similarity-based ranked categories of the fuzzy attribute, and based on the true values and the predicted values of the category of the fuzzy attribute for the multiple object samples, updating values of corresponding elements in the initialization matrix; and displaying the similarity-based ranked confusion matrix.

19 Claims, 4 Drawing Sheets

(51) Int. Cl.
*G06F 18/2113* (2023.01)
*G06F 18/22* (2023.01)
*G06F 18/2431* (2023.01)
*G06V 40/16* (2022.01)

(56) References Cited

OTHER PUBLICATIONS

Borza D. et al, A Deep Learning Approach to Hair Segmentation and Color Extraction from Facial Images, in Proc. of Advanced Concepts for Intelligent Vision Systems, ACIVS2018, Sep. 25, 2018, vol. 11182, and pp. 438-449 [search on Nov. 23, 2022]<DOI: 10.1007/978-3-030-01449-0_37> section 3, section 4.3 and section 4.4, tables 2 and 4, and figures 1-2.

Stallkamp J. et al, The German Traffic Sign Recognition Benchmark: A multi-class classification competition, in Proc of the IEEE 2011 International Joint Conference on Neural Networks, Aug. 5, 2011, and pp. 1-9, [searched on Nov. 23, 2022] <DOI: 10.1109/IJCNN.2011.6033395>abstract, sections IV-B, section V, sections V-D, and figures 6-7.

Feng M. et al, A Classified Method of Human Hair for Hair Sketching, in Proc. of IEEE2008 Congress on Image and Signal Processing, May 30, 2008, pp. 109-114, [searched on Nov. 23, 2022]<DOI: 10.1109/CISP.2008.127>abstract, sections 2-4, and figures 2, 4, 6, 8 and 10.

Sunhem W. et al, An Approach to Face Shape Classification for Hairstyle Recommendation, in Pro. of IEEE 2016 Eighth International Conference on Advanced Computational Intelligence (ICACI), Feb. 16, 2016, pp. 390-394, [searched on Nov. 23, 2022]<DOI: 10.1109/ICACI.2016. 7449857>abstract, figure 1, section III-A and section III-C. and tables II-IX.

George A. etal, Real-time Eye Gaze Direction Classification Using Convolutional Neural Network, in Proc of IEEE 2016 International Conference on Signal Processing and Communications (SPCOM), Jun. 15, 2016, and pp. 1-5, [searched on Nov. 23, 2022]<DOI: 10.1109/SPCOM.2016. 7746701>, section III and section IV, and figures 5-6.

International Search Report dated Jan. 5, 2023 for International Application No. PCT/SG2022/050376.

Written Opinion for International Application No. PCT/SG2022/050376.

* cited by examiner

|  | Triangular | Pear-shaped | Rectangular | Oval | Square | Round |
|---|---|---|---|---|---|---|
| Triangular | 3 | 0 | 5 | 23 | 0 | 0 |
| Pear-shaped | 0 | 2 | 0 | 0 | 0 | 0 |
| Rectangular | 2 | 0 | 25 | 26 | 0 | 0 |
| Oval | 0 | 3 | 9 | 59 | 0 | 0 |
| Square | 0 | 2 | 9 | 5 | 0 | 0 |
| Round | 0 | 1 | 0 | 11 | 0 | 0 |

METHOD AND DEVICE FOR EVALUATING EFFECT OF CLASSIFYING FUZZY ATTRIBUTE

CROSS-REFERENCE TO RELATED APPLICATION

The present disclosure is based on and claims priority to China Patent Application No. 202110869963.5 filed on Jul. 30, 2021, the disclosure of which is incorporated by reference herein in its entirety.

TECHNICAL FIELD

The present disclosure relates to a method, device, electronic device, computer-readable storage medium, and computer program product for evaluating an effect of classifying a fuzzy attribute of an object.

BACKGROUND

Face attribute recognition is a technology for recognizing various attributes owned by a person by analyzing an input face image. The correct face attribute recognition has very important reference significance for scenarios such as security monitoring, personalized recommendation, and virtual image generation.

Attribute recognition is usually defined as a classification task, and the classification effect is judged according to a traditional classification indicator such as single-label precision rate.

SUMMARY

The present disclosure provides a new method and device for evaluating an effect of classifying a fuzzy attribute.

According to some embodiments of the present disclosure, a method is provided for evaluating an effect of classifying a fuzzy attribute of an object, the fuzzy attribute referring to an attribute, a boundary between two similar ones of a plurality of categories of which is blurred, wherein the method comprises: generating a similarity-based ranked confusion matrix, which comprises: based on similarities of K categories of the fuzzy attribute of the object, ranking the K categories of the fuzzy attribute of the object, where K is an integer greater than or equal to 2, generating a K×K all-zero initialization matrix, which comprises K×K elements $a_{ij}$, where i and j are integers and take values from 1 to K respectively, wherein an abscissa and an ordinate of the initialization matrix respectively represent predicted values of the similarity-based ranked categories of the fuzzy attribute and true values of the similarity-based ranked categories of the fuzzy attribute, and based on the true values of the category of the fuzzy attribute for multiple object samples and the predicted values of the category of the fuzzy attribute for the multiple object samples, updating values of corresponding elements in the initialization matrix, such that the value of the element in the updated initialization matrix represents the number of object samples with corresponding true and predicted values; and displaying the similarity-based ranked confusion matrix, wherein the distribution of non-zero elements in the similarity-based ranked confusion matrix indicates accuracy of the classification.

Other features, aspects and advantages of the present disclosure will become apparent through the following detailed description of exemplary embodiments of the present disclosure with reference to the accompanying drawings.

BRIEF DESCRIPTION OF THE DRAWINGS

Preferred embodiments of the present disclosure will be described below with reference to the accompanying drawings. The accompanying drawings described herein are used for providing a further understanding of the present disclosure, and the accompanying drawings, together with the following detailed description, are included in the specification and form a part of the specification, to explain the present disclosure. It should be understood that the drawings in the following description only relate to some embodiments of the present disclosure, and do not constitute a limitation on the present disclosure. In the accompanying drawings.

DETAILED DESCRIPTION

The technical solutions in the embodiments of the present disclosure will be clearly and completely described below in conjunction with the accompanying drawings in the embodiments of the present disclosure. However, it is obvious that the described embodiments are only some of the embodiments of the present disclosure, rather than all of them. The following description of the embodiments is actually only illustrative, and in no way serves as any limitation on the present disclosure and its application or use. It should be understood that the present disclosure can be implemented in various forms, and should not be construed as limited to the embodiments set forth herein.

It should be understood that steps recited in method implementations of the present disclosure can be performed in a different order, and/or in parallel. In addition, the method implementations can include additional steps and/or omit performing illustrated steps. The scope of the present disclosure is not limited in this respect. Unless specifically stated otherwise, relative arrangements of components and steps, numerical expressions, and numerical values set forth in these embodiments should be construed as merely exemplary and do not limit the scope of the present disclosure.

In the following description, a human face is taken as an object to describe the evaluation of the effect of classifying a fuzzy attribute of the human face.

In the present disclosure, the "fuzzy attribute" refers to an attribute, a boundary between two similar ones of a plurality of categories of which is blurred. Taking a hair attribute of the human face as an example, the hair attribute may include, for example, the following categories: bald, short spiky hair, crew cut hair, short hair, medium-length hair, and long hair. It is easy to understand that, for example, the boundary between the "short spiky hair" and the "crew cut hair" is blurred, and for another example, the boundary between the "medium-length hair" and the "long hair" is blurred. In the present disclosure, the fuzzy attribute of the human face comprises the following attributes of the human face: face shape, hair, eyebrows, eyes, ears, nose, and mouth.

It should be understood that the attribute of the human face includes a fuzzy attribute and a non-fuzzy attribute. In contrast to the fuzzy attribute, the non-fuzzy attribute may have two or more categories and a boundary between arbitrary two categories is distinct.

In the present disclosure, a "similarity-based ranked confusion matrix" refers to a matrix that shows true and predicted categories of the fuzzy attribute of the human face in contrast, and reflects similarities between the categories of the fuzzy attribute of the human face.

Figure 1:
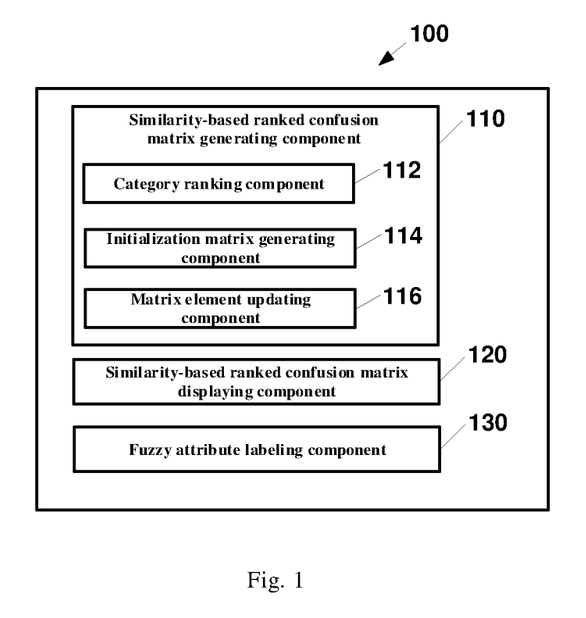
FIG. 1 is a block diagram of an exemplary fuzzy attribute classification effect evaluation device according to some embodiments of the present disclosure.

FIG. 1 is a block diagram of an exemplary fuzzy attribute classification effect evaluation device 100 according to some embodiments of the present disclosure.

As shown in FIG. 1, the device 100 may comprise: a similarity-based ranked confusion matrix generating component 110 configured to receive true and predicted categories of a fuzzy attribute of a human face image, and to generate a similarity-based ranked confusion matrix; and a similarity-based ranked confusion matrix displaying component 120 configured to display the similarity-based ranked confusion matrix via a display or the like. Further, the similarity-based ranked confusion matrix generating component 110 may comprise: a category ranking component 112, an initialization matrix generating component 114, and a matrix element updating component 116. Here, the category ranking component 112 is configured to rank the plurality of categories based on similarities of the plurality of categories of the fuzzy attribute of the human face. The initialization matrix generating unit 114 is configured to generate an all-zero initialization matrix, wherein an abscissa and an ordinate of the matrix respectively represent a predicted category of the fuzzy attribute of the human face and a true category of the fuzzy attribute of the human face. The matrix element updating component 116 is configured to update values of corresponding elements in the initialization matrix based on true and predicted categories of the fuzzy attribute of multiple human face samples (i.e., human face images), such that the value of the element in the updated matrix represents the number of object samples with corresponding true and predicted categories.

The device 100 may further comprise a fuzzy attribute labeling component 130 configured to in a stage of labeling the category of the fuzzy attribute of the human face sample, label multiple acceptable categories of the fuzzy attribute as the category of the fuzzy attribute.

Operations of the components shown in FIG. 1 will be further described in detail below.

Figure 2:
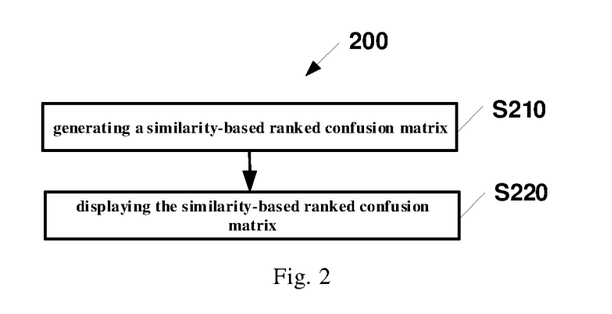
FIG. 2 is a flowchart illustrating an exemplary fuzzy attribute classification effect evaluation method according to some embodiments of the present disclosure.

FIG. 2 is a flowchart illustrating a fuzzy attribute classification effect evaluation method 200 according to some embodiments of the present disclosure.

The method 200 starts from a step S210. At the step S210, the similarity-based ranked confusion matrix generating component 110 receives the true and predicted categories of the fuzzy attribute of the human face, and generates the similarity-based ranked confusion matrix. Specific operations of the similarity-based ranked confusion matrix generating unit 110 will be described below with reference to FIG. 3.

Next, the method 200 proceeds to a step S220. At the step S220, the similarity-based ranked confusion matrix displaying component 120 displays the generated similarity-based ranked confusion matrix via a display or the like.

Figure 3:
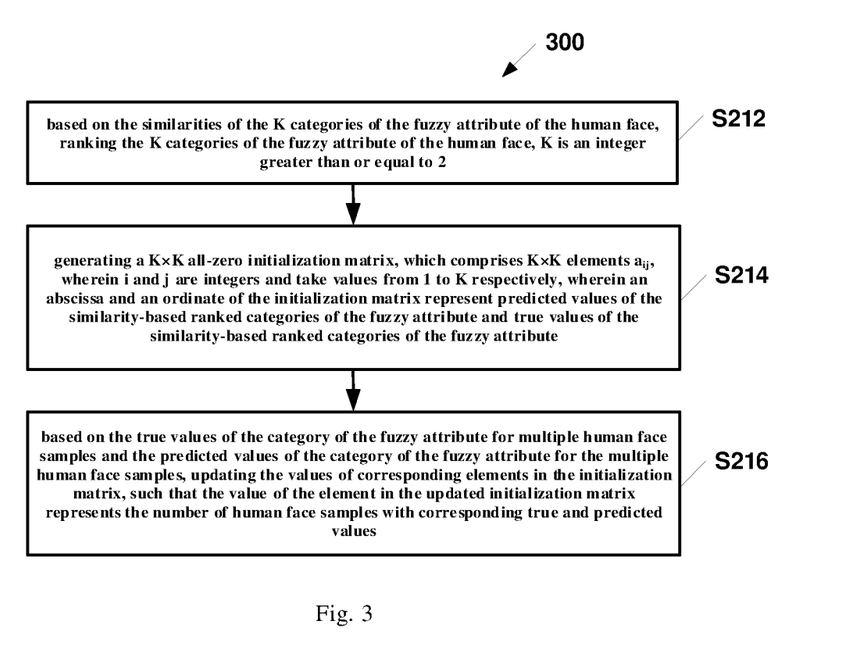
FIG. 3 is a flowchart illustrating an exemplary process of generating a similarity-based ranked confusion matrix according to some embodiments of the present disclosure.

FIG. 3 is a flowchart illustrating an exemplary process 300 of generating a similarity-based ranked confusion matrix according to some embodiments of the present disclosure.

The process 300 starts from a step S212. At the step S212, the component 110 ranks K categories of the fuzzy attribute of the object based on similarities of the K categories of the fuzzy attribute of the human face, where K is an integer greater than or equal to 2.

The K categories of the fuzzy attribute of the human face may be predefined, for example, they may be predefined based on expert experience. The similarities of the K categories may refer to the similarities or correlations between labels of the K categories. The similarities of the K categories may be predefined. Alternatively, the similarities of the K categories may be calculated according to a machine learning algorithm. The similarities between the multiple of categories may be determined according to any known method.

Taking the face shape attribute of the human face as an example. Six categories of the face shape, which are, more specifically, the six categories ranked according to the similarities, may be: triangular face, pear-shaped face, rectangular face, oval face, square face, and round face. In this order, the similarities of the pear-shaped face, rectangular face, oval face, square face, and round face to the triangular face gradually decreases.

Next, the process 300 proceeds to a step S214. At the step S214, the component 110 generates a K×K all-zero initialization matrix, which comprises K×K elements $a_{ij}$ where i and j are integers and take values from 1 to K respectively, wherein an abscissa and an ordinate of the initialization matrix respectively represent predicted values of the similarity-based ranked categories of the fuzzy attribute and true values of the similarity-based ranked categories of the fuzzy attribute. In some embodiments, the abscissa represents the predicted values, and the ordinate represents the true values. In other embodiments, the abscissa represents the true values, and the ordinate represents the predicted values.

Still taking the face shape attribute of the human face as an example, in the case where the face shape attribute of the human face comprises the six categories described above, a 6×6 matrix is generated at the step S214. Along the abscissa and the ordinate, values 1 to 6 may be used to respectively represent the six categories of the face shape, which are ranked according to the similarities. For example, the values 1 to 6 are used to respectively represent triangular face, pear-shaped face, rectangular face, oval face, square face, and round face.

Next, the process 300 proceeds to a step S216. At the step S216, the component 110 updates values of corresponding elements in the initialization matrix based on true values of the category of the fuzzy attribute of multiple human face samples (i.e., human face images) and predicted values of the category of the fuzzy attribute of the multiple object samples, such that the value of the element in the updated initialization matrix represents the number of human face samples with corresponding true and predicted values. The component 110 outputs the updated initialization matrix as the similarity-based ranked confusion matrix to the component 120.

The true value of the category of the fuzzy attribute of the human face image may be pre-labeled. For example, when a target face image is labeled, the following labels may be add to it: face shape-rectangular face; hair-long hair; and so on. According to this, it may be determined that the true value of the category of the face shape attribute of the target face image is, for example, "3".

The predicted value of the category of the fuzzy attribute of the human face image may come from a prediction model which receives the target face image as described above and outputs the predicted value of the category of one or more attributes of the target face image. For example, in the case of accurate prediction, the prediction model may predict the category of the face shape attribute of the target face image as the rectangular face, that is, the predicted value is "3". In the case of a slight prediction deviation, the prediction model may predict the category of the face shape attribute of the target face image as the oval face, that is, the predicted value is "4". In the case of a large prediction deviation, the prediction model may predict the category of the face shape attribute of the target face image as the triangular face, that is, the predicted value is "1". The prediction model here may adopt any known model based on a machine learning technology, which is not limited in the present disclosure.

The component 110 can, for example, determine the true value of the category of the fuzzy attribute of the human face image from the labels of the human face image. And the component 110 may receive the predicted value of the category of the fuzzy attribute of the human face image from the prediction model. Then, the component updates the values of the corresponding elements in the initialization matrix based on the true and predicted values of the category of the fuzzy attribute of the multiple face images.

In some embodiments, when the matrix element is updated, for each face image in the plurality of human face images, in the case where a first true value (such as the rectangular face "3") is predicted as a first predicted value (such as the rectangular face "3"), a value of an element (such as $a_{33}$) corresponding to the first true value and the first predicted value in the initialization matrix is increased by a preset amount. Similarly, in the case where the first true value (such as the rectangular face "3") is predicted as the first predicted value (such as the oval face "4"), the value of the element (such as $a_{34}$) corresponding to the first true value and the first predicted value in the initialization matrix is increased by the preset amount. Here, the preset amount may be 1.

It should be understood that the value of the element in the matrix may be updated in various ways, as long as the position of the updated element corresponds to the true and predicted values of the category of the fuzzy attribute of the human face image, and the value of the updated element represents the number of face images with the corresponding true and predicted values.

Figure 4:
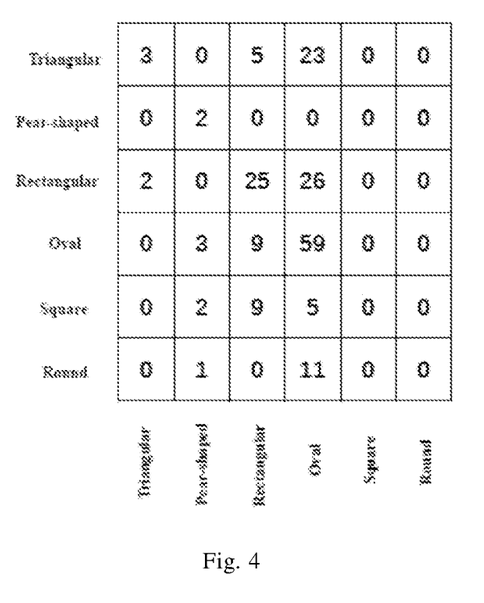
FIG. 4 illustrates an exemplary similarity-based ranked confusion matrix generated according to classification prediction results with respect to a face shape attribute of a human face according to some embodiments of the present disclosure.

FIG. 4 illustrates an exemplary similarity-based ranked confusion matrix generated according to classification prediction results with respect to a face shape attribute of a human face according to some embodiments of the present disclosure.

As shown in FIG. 4, the abscissa of the similarity-based ranked confusion matrix represents the predicted value of the similarity-based ranked categories of the face shape. For example, the abscissa values 1 to 6 (from left to right) respectively represent the following face shapes: triangular face, pear-shaped face, rectangular face, oval face, square face, and round face. The ordinate of the similarity-based ranked confusion matrix represents the true value of the similarity-based ranked categories of the face shape. For example, the ordinate values 1 to 6 (from top to bottom) respectively represent the following face shapes: triangular face, pear-shaped face, rectangular face, oval face, square face, and round face.

The similarity-based ranked confusion matrix shown in FIG. 4 is generated based on classification prediction results of about 200 face images. The numerical value of the element in the matrix represents the number of face images with the true value represented by its ordinate and the predicted value represented by its abscissa. Taking "2, 0, 25, 26, 0, 0" in a $3^{th}$ row of the matrix as an example, a number 2 at the element $a_{31}$ represents the number of face images with the true value of 3 (the rectangular face) and the predicted value of 1 (the triangular face). A number 25 at the element $a_{33}$ represents the number of face images with the true value of 3 (the rectangular face) and the predicted value of 3 (the rectangular face), and a number 26 at the element $a_{34}$ represents the number of face images with the true value of 3 (the rectangular face) and the predicted value of 4 (the oval face). That is to say, for 53 face images whose true category of the face shape is the rectangular face, 2 images therein are classified as the triangular face, 25 images are classified as the rectangular face, and 26 images are classified as the oval face.

It can be understood that non-zero values of elements ($a_{11}$, $a_{22}$, $a_{33}$, $a_{44}$, $a_{55}$, $a_{66}$) on a diagonal of the matrix indicate accurate predictions of the categories. For elements close to the diagonal, such as elements adjacent to elements on the diagonal, their non-zero values indicate relatively accurate predictions. However, for elements far from the diagonal, such as elements not adjacent to the elements on the diagonal, their non-zero values indicate less accurate predictions. Here, it can be understood that the accuracy of the prediction is the accuracy of the classification of the fuzzy attribute.

In the prior art, when evaluating the effect of classifying the attribute, only the case where the predicted category of the attribute is the same as the true category (such as the rectangular face being predicted as the rectangular face) is deemed to be correct classification, while other cases (such as the rectangular face being predicted as the oval face) are deemed to be wrong classification. In this case, taking data in the $3^{th}$ row in FIG. 4 as an example, according to an evaluation indicator of the prior art, the accuracy of the classification of the face shape attribute of the human face will be 25/53≈47%.

Inventors of the present disclosure recognize that such an evaluation indicator in the prior art cannot well reflect the accuracy of the classification of the face attribute (especially the fuzzy attribute). For example, it is generally acceptable to classify the rectangular face as the oval face because the two categories of the face shape are very similar. In addition, it is generally unacceptable to classify the rectangular face as the triangular face because the two categories of the face shape are quite different. Still taking the data in the $3^{th}$ row in FIG. 4 as an example, the accuracy of the classification of the face shape attribute of the human face should be actually 51/53≈96%. In other words, the existing evaluation indicator cannot be aligned with the actual classification effect.

In some embodiments, when the evaluation indicator of the prior art cannot accurately reflect the actual classification effect, the solutions of the present disclosure may be used to evaluate the accuracy of the classification. More specifically, when the ratio, which is taken as the evaluation indicator of the prior art, of the number of samples, for each of which the predicted and true values are the same, to the total number of object samples, is less than a predetermined threshold (such as 50%, 60%, or any other suitable value set according to actual conditions), the accuracy of the classification may be evaluated using the solutions of the present disclosure.

According to the solutions of the present disclosure, by generating and displaying the similarly-based ranked confusion matrix as described above, the actual classification effect of the fuzzy attribute may be shown intuitively. It should be understood that, in the present disclosure, the similarity-based ranked confusion matrix is the evaluation result of evaluating the accuracy of the classification. It can be understood that the closer the non-zero elements in the similarity-based ranked confusion matrix are distributed to a main diagonal of the similarity-based ranked confusion matrix, the higher the accuracy of the classification is.

In addition, the similarity-based ranked confusion matrix may reflect the classification situations of different true categories of the fuzzy attribute. As shown by data in a first row of the similarity-based ranked confusion matrix in FIG. 4, the accuracy of the classification of the triangular face is low. Therefore, this may prompt a technician to take corresponding measures to improve the accuracy of the classification of the triangular face, such as debugging the prediction model, using more face images with the triangular face to train the prediction model, and so on.

Incidentally, for the true category of the fuzzy attribute, which predicted categories are acceptable and which predicted categories are unacceptable, this may be pre-defined according to expert experience. The inventors of the present disclosure also recognize that in the prior art, when labeling the fuzzy attribute, if the fuzzy attribute might belong to a plurality of categories, the category of the fuzzy attribute is labeled as an arbitrary one of the plurality of categories. For example, taking the hair attribute of the human face as an example, a chest-length hair sample may be classified into the category of "medium-length hair" or into the category of "long hair". The chest-length hair sample belongs to the sample at a boundary between the category of "medium-length hair" and the category of "long hair". In this case, in the prior art, such a sample is randomly labeled as the category of "medium-length hair" or the category of "long hair". And in the case of labeling such a hair sample as the category of "medium-length hair", according to the evaluation indicator of the prior art, the classification result of "long hair" will be judged to be wrong classification. Once again, the existing evaluation indicator cannot be aligned with the actual classification effect.

Figure 5:
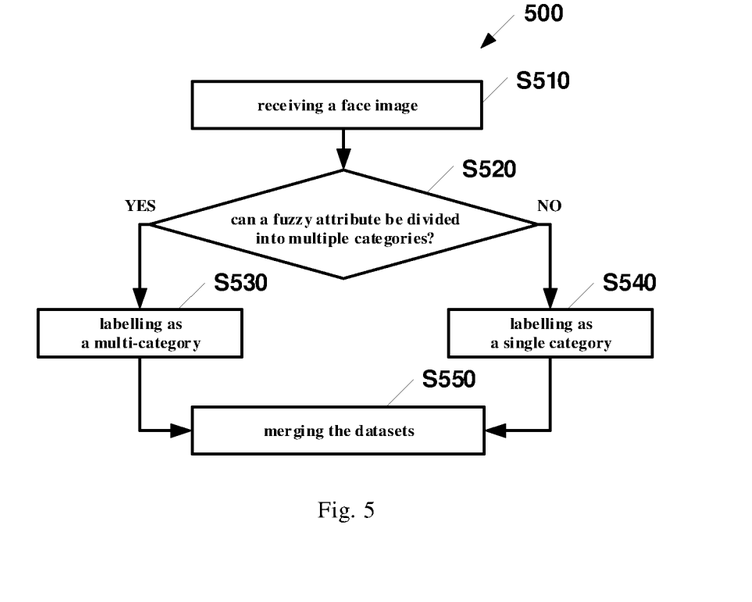
FIG. 5 is a flowchart illustrating a fuzzy attribute labeling method according to some embodiments of the present disclosure.

In order to solve this problem, the inventors of the present disclosure propose a new method of labeling the fuzzy attribute. This method is described below with reference to FIG. 5. FIG. 5 is a flowchart illustrating a fuzzy attribute labeling method 500 according to some embodiments of the present disclosure.

The method 500 starts at a step S510. At the step S510, the fuzzy attribute labeling component 130 receives a human face image.

Next, the method 500 proceeds to a step S520. At the step S520, the component 130 judges whether a fuzzy attribute of an object in the human face image can be divided into a plurality of categories. This judgment may be conducted by human. In this case, the component 130 may receive a manual input of "yes" or "no". Alternatively, this judgment may also be conducted by a machine. For example, if it is determined that a numerical value representing the fuzzy attribute of the object is at or near a boundary between adjacent categories, it may be judged that the fuzzy attribute of the object can be divided into the plurality of categories. In the case of the judgment of "Yes", the method proceeds to a step S530; and in the case of the judgment of "No", the method proceeds to a step S540.

For example, considering the aforementioned case of the chest-length hair sample, in this case, it is judged in the step S520 that the hair attribute of the sample can be divided into two categories, namely the category of "medium-length hair" and the category of "long hair".

At the step S530, the component 130 labels the fuzzy attribute of the object in the human face image as a multi-category. More specifically, the component 130 labels multiple acceptable categories of the fuzzy attribute of the object in the human face image as the category of the fuzzy attribute of the object. For example, the component 130 may add the following label to the chest-length hair sample: hair: medium-length hair, long hair.

At the step S540, the component 130 labels the fuzzy attribute of the object in the human face image as a single category.

Then, the method 500 proceeds to a step S550. At the step S550, the component 130 merges the labeled face images into a same data set.

Different from adding the single label indicating the category to the fuzzy attribute of the human face in the prior art, according to the present disclosure, multiple labels indicating multiple acceptable categories are added to the fuzzy attribute of the human face. This solves the problem that the evaluation indicator cannot be aligned with the actual classification effect from its root cause. Specifically, by labeling the multiple acceptable categories of the fuzzy attribute as the true category of the fuzzy attribute, the classification results of the multiple acceptable categories may be judged as the correct classification results in the subsequent evaluation of the classification effect, which enables the evaluation results to be aligned with the actual classification results.

In the fuzzy attribute classification effect evaluation method introduced above with reference to FIGS. 2 and 3, the true value of the category of the fuzzy attribute of the human face image may be either a single value indicating the category of the fuzzy attribute, or a plurality of values indicating the multiple acceptable categories of the fuzzy attribute. For example, still taking the face shape attribute as an example, the true category of the face shape of the target face image may be a rectangular face, i.e., the true value of "3", or the rectangular face and the oval face, i.e., the true values of "3" and "4". It should be understood that, "multiple values indicating the multiple acceptable categories of the fuzzy attribute", which are taken as the true value of the category of the fuzzy attribute mentioned here, are realized by the method shown in FIG. 5, that is, by adding multiple category labels to the single fuzzy attribute.

When the matrix element is updated, in the case where the true value is a single value, a value of a single element corresponding to the single value and the predicted value may be updated. In the case where the true value is a plurality of values, values of a plurality of elements corresponding to each of the plurality of values and the predicted value may be updated. It should be understood that regardless of whether the true value is the single value or the plurality of values, the predicted value is a single value. For example, still taking the face shape attribute as an example, in the case where the true value is "3" and the predicted value is "4", the element $a_{34}$ may be updated; while in the case where the true values are "3" and "4" and the predicted value is "4", the elements $a_{34}$ and $a_{44}$ may be updated.

The above description is made with the human face as the object. However, it should be understood that the present disclosure is not limited thereto. For example, the present disclosure may also evaluate the classification effect of fuzzy attributes of objects besides the human faces, such as animals, buildings, etc.

Hardware Implementation

Figure 6:
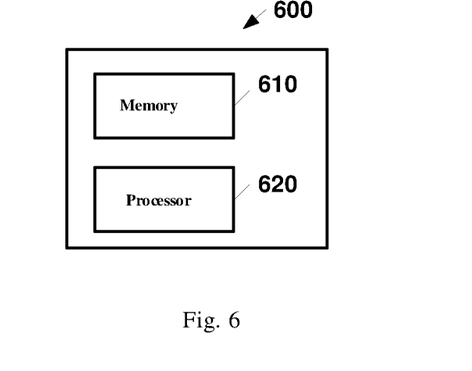
FIG. 6 is a block diagram of an exemplary electronic device in which the present disclosure can be applied according to some embodiments of the present disclosure.

Some embodiments of the present disclosure also provide an electronic device. FIG. 6 shows a block diagram of an electronic device according to some embodiments of the present disclosure. For example, in some embodiments, an electronic device 600 may be various types of devices, for example, it may include, but is not limited to, mobile terminals such as mobile phones, notebook computers, digital broadcast receivers, PDAs (personal digital assistants), PADs (tablet computers), PMPs (portable multimedia players), in-vehicle terminals (e.g., in-vehicle navigation terminals), and fixed terminals such as digital TVs, desktop computers, and the like. For example, the electronic device 600 may include a display panel for displaying data and/or execution results utilized in the solutions according to the present disclosure. For example, the display panel may be various shapes, e.g., a rectangular panel, an oval panel, a polygonal panel, or the like. In addition, the display panel may be not only a flat panel, but also a curved panel, or even a spherical panel.

As shown in FIG. 6, the electronic device 600 of this embodiment comprises: a memory 610 and a processor 620 coupled to the memory 610. It should be noted that the components of the electronic device 600 shown in FIG. 6 are only exemplary but not restrictive. According to actual application requirements, the electronic device 600 may also have another component. The processor 620 may control other components in the electronic device 600 to perform a desired function.

In some embodiments, the memory 610 is configured to store one or more computer-readable instructions. When the processor 620 is configured to run the computer-readable instructions, the computer-readable instructions are executed by the processor 620 to implement the method according to any of the above embodiments. For the specific implementation and related explanation with respect to each step of the method, please refer to the above embodiments, which will not be repeated herein.

For example, the processor 620 and the memory 610 may directly or indirectly communicate with each other. For example, the processor 620 and the memory 610 may communicate through a network. The network may include a wireless network, a wired network, and/or any combination of the wireless network and the wired network. The processor 620 and the memory 610 may also communicate with each other through a system bus, which is not limited in the present disclosure.

For example, the processor 620 may be embodied as various appropriate processors, processing devices, etc., such as a central processing unit (CPU), graphics processing unit (GPU), network processor (NP), etc.; and it may also be a digital processor, digital signal processor (DSP), application specific integrated circuit (ASIC), field programmable gate array (FPGA) or other programmable logic device, discrete gate or transistor logic device, discrete hardware component. The central processing unit (CPU) may be an X86 or ARM architecture. For example, the memory 610 may include any combination of various forms of computer-readable storage media, such as a volatile memory and/or a non-volatile memory. The memory 610 may include, for example, a system memory on which are stored, for example, an operating system, an application, a boot loader, a database, other programs, and the like. Various applications, various data, and the like, may also be stored in the storage medium.

Figure 7:
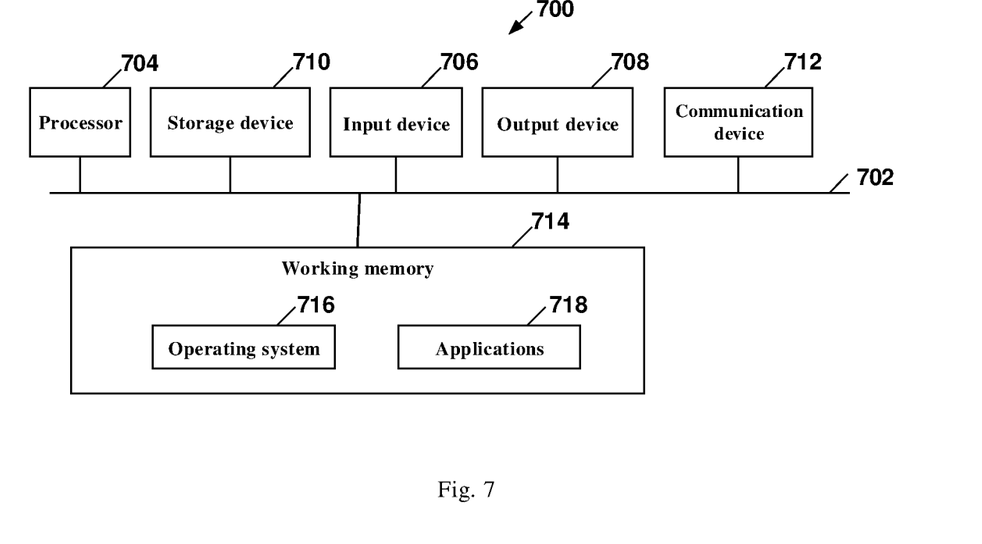
FIG. 7 illustrates a general hardware environment in which the present disclosure can be applied according to some embodiments of the present disclosure.

FIG. 7 shows a general hardware environment 700 in which the present disclosure may be applied according to an exemplary embodiment of the present disclosure.

Referring to FIG. 7, a computing device 700 taken as an example of a hardware device applicable to various aspects of the present disclosure will now be described. The computing device 700 may be any machine configured to perform processing and/or calculations, and may be, but is not limited to, a workstation, a server, a desktop computer, a laptop computer, a tablet computer, a personal digital assistant, a smart phone, a portable camera, or any combination thereof. The foregoing apparatus 100 may be implemented in whole or at least in part by the computing device 700 or a similar device or system.

The computing device 700 may include an element capable of being connected to or communicating with a bus 702 via one or more interfaces. For example, the computing device 700 may include the bus 702, one or more processors 704, one or more input devices 706, and one or more output devices 708. The one or more processors 704 may be any type of processor, and may include, but are not limited to, one or more general-purpose processors and/or one or more special-purpose processors (such as special-purpose processing chips). The input device 706 may be any type of device capable of inputting information to the computing device, and may include, but is not limited to, a mouse, a keyboard, a touch screen, a microphone, and/or a remote control. The output device 708 may be any type of device capable of presenting information, and may include, but is not limited to, a display, a speaker, a video/audio output terminal, and/or a printer. The computing device 700 may also include a non-transitory storage device 710 or be connected to the non-transitory storage device 710. The non-transitory storage device 710 may be any storage device that is non-transitory and may implement a data storage library, and may include, but is not limited to a disk drive, optical storage device, solid-state storage device, floppy disk, flexible disk, hard disk, tape or any other magnetic medium, compact disk or any other optical medium, ROM (read-only memory), RAM (random access memory), high-speed Cache memory and/or any other memory chip or cassette, and/or any other medium from which the computer may read data, instructions, and/or code. The non-transitory storage device 710 may be detachable from the interface. The non-transitory storage device 710 may have data/instructions/code for implementing the above methods and steps. The computing device 700 may also include a communication device 712. The communication device 712 may be any type of device or system capable of communicating with an external device and/or with a network, and may include, but is not limited to, a modem, a network card, an infrared communication device, a wireless communication device, and/or chipsets such as Bluetooth™, 802.11 devices, WiFi devices, WiMax devices, cellular communication facilities, etc.

The bus 702 may include, but is not limited to, an industry standard architecture (ISA) bus, a micro channel architecture (MCA) bus, an enhanced ISA (EISA) bus, a video electronics standard association (VESA) local bus, and a peripheral component interconnect (PCI) bus.

The computing device 700 may also include a working memory 714. The working memory 714 may be any type of working memory that may have therein stored instructions and/or data useful for the work of the processor 704, and that may include, but is not limited to, a random access memory and/or a read-only memory device.

Software elements may be located in the working memory 714, and include, but is not limited to, an operating system 716, one or more applications 718, drivers, and/or other data and code. The instructions for executing the above methods and steps may be included in the one or more applications 718, and the components of the above apparatus 100 may be implemented by the processor 704 reading and executing the instructions of the one or more applications 718. More specifically, the similarity-based ranked confusion matrix generating component 110 may be implemented, for example, by the processor 704 when executing the application 718 having instructions for executing the step S210 (or the steps S212, S214, and S216). The similarity-based ranked confusion matrix displaying component 120 may be implemented, for example, by the processor 704 when executing the application 718 having instructions for executing the step S220. The fuzzy attribute labeling component 130 may be implemented, for example, by the processor 704 when executing the application 718 having instructions for executing the steps S510 to S550. Further, the category ranking component 112 may be implemented, for example, by the processor 704 when executing the application 718 having instructions for executing the step S212. The initialization matrix generating component 114 may be implemented, for example, by the processor 704 when executing the application 718 having instructions for executing the step S214. The matrix element updating component 116 may be implemented, for example, by the processor 704 when executing the application 718 having instructions for executing the step S216. The executable code or source code of the instructions of the software element may be stored in a non-transitory computer-readable storage medium (such as the above (one or more) storage device(s) 710), and may be read into the working memory 714 in the case where it may be compiled and/or installed. The executable code or source code of the instructions of the software element may also be downloaded from a remote location.

From the foregoing embodiments, those skilled in the art may clearly know that the present disclosure may be implemented by software and necessary hardware, or by hardware, firmware, and the like. Based on this understanding, the embodiments of the present disclosure may be partially implemented in the form of software. Computer software may be stored in a computer-readable storage medium, such as a floppy disk, hard disk, optical disk, or flash memory. The computer software includes a series of instructions that allow a computer (for example, a personal computer, a service station, or a network terminal) to execute the method or a part thereof according to the various embodiments of the present disclosure.

The present disclosure has been described in such a way, and it is clear that the present disclosure may be changed in many ways. These changes are not deemed to depart from the spirit and scope of the present disclosure, but it is obvious to those skilled in the art that all such modifications are intended to be included in the scope of the following claims.

What is claimed is:

1. A method for evaluating an effect of classifying a fuzzy attribute of an object, the fuzzy attribute referring to an attribute, a boundary between two similar ones of a plurality of categories of which is blurred, wherein the method comprises:
generating a similarity-based ranked confusion matrix, which comprises:
based on similarities of K categories of the fuzzy attribute of the object, ranking the K categories of the fuzzy attribute of the object, where K is an integer greater than or equal to 2,
generating a K×K all-zero initialization matrix, which comprises K×K elements where i and j are integers and take values from 1 to K respectively, wherein an abscissa and an ordinate of the initialization matrix respectively represent predicted values of the similarity-based ranked categories of the fuzzy attribute and true values of the similarity-based ranked categories of the fuzzy attribute, and
based on the true values of the category of the fuzzy attribute for multiple object samples and the predicted values of the category of the fuzzy attribute for the multiple object samples, updating values of corresponding elements in the initialization matrix, such that the value of the element in the updated initialization matrix represents the number of object samples with corresponding true and predicted values; and
displaying the similarity-based ranked confusion matrix, wherein the distribution of non-zero elements in the similarity-based ranked confusion matrix indicates accuracy of the classification.

2. The method according to claim 1, wherein the updating values of corresponding elements in the initialization matrix based on the true values of the category of the fuzzy attribute for multiple object samples and the predicted values of the category of the fuzzy attribute for the multiple object samples comprises:
for each object sample in the multiple object samples, in the case where a first true value is predicted to be a first predicted value, increasing a value of an element corresponding to the first true value and the first predicted value in the initialization matrix by a preset amount.

3. The method according to claim 1, wherein the closer the non-zero elements in the similarity-based ranked confusion matrix are distributed to a main diagonal of the similarity-based ranked confusion matrix, the higher the accuracy of the classification is.

4. The method according to claim 1, wherein the true value of the category of the fuzzy attribute of the object sample comprises: a single value indicating the category of the fuzzy attribute.

5. The method according to claim 1, wherein the true value of the category of the fuzzy attribute of the object sample comprises: a plurality of values indicating multiple acceptable categories of the fuzzy attribute.

6. The method according to claim 5, further comprising: in a stage of labeling the category of the fuzzy attribute of the object sample, labeling the multiple acceptable categories of the fuzzy attribute as the category of the fuzzy attribute.

7. The method according to claim 1, wherein the K categories of fuzzy attribute of the object are arranged in ascending or descending order of the similarities of the categories along the abscissa or ordinate of the matrix.

8. The method of claim 1, wherein the object comprises a human face, and the object sample comprises a human face image.

9. The method according to claim 8, wherein the fuzzy attribute of the object comprises the following attributes of the human face: face shape, hair, eyebrows, eyes, ears, nose, or mouth.

10. The method according to claim 9, wherein, in the case where the fuzzy attribute of the object refers to the face shape of the human face, the K categories of the fuzzy attribute of the object comprise: triangular face, pear-shaped face, rectangular face, oval face, square face, and round face.

11. The method according to claim 9, wherein, in the case where the fuzzy attribute of the object refers to the hair of the human face, the K categories of the fuzzy attribute of the object comprise: bald, short spiky hair, crew cut hair, short hair, medium-length hair, and long hair.

12. The method according to claim 1, wherein the predicted values of the category of the fuzzy attribute of the multiple object samples are from a prediction model that receives the multiple object samples and outputs the predicted values of the category of the fuzzy attribute of the multiple object samples.

13. A method for evaluating an effect of classifying an attribute of an object, wherein the method comprises:
comparing true values of a category of an attribute of multiple object samples and predicted values of the category of the attribute of the multiple object samples, wherein the true value is a single value, and the predicted value is a single value, and determining a ratio of a number of samples for each of which the predicted value is the same as the true value to a total number of the multiple object samples; and
in the case where the ratio is less than a predetermined threshold, determining a corresponding attribute of the object as a fuzzy attribute of the object, the fuzzy attribute referring to an attribute, a boundary between two similar ones of a plurality of categories of which is blurred, and using the following steps to evaluate accuracy of the classification,
generating a similarity-based ranked confusion matrix, which comprises:
based on similarities of K categories of the fuzzy attribute of the object, ranking the K categories of the fuzzy attribute of the object, where K is an integer greater than or equal to 2,
generating a K×K all-zero initialization matrix, which comprises K×K elements $a_{ij}$, where i and j are integers and take values from 1 to K respectively, wherein an abscissa and an ordinate of the initialization matrix respectively represent predicted values of the similarity-based ranked categories of the fuzzy attribute and true values of the similarity-based ranked categories of the fuzzy attribute, and
based on the true values of the category of the fuzzy attribute for multiple object samples and the predicted values of the category of the fuzzy attribute for the multiple object samples, updating values of corresponding elements in the initialization matrix, such that the value of the element in the updated initialization matrix represents the number of object samples with corresponding true and predicted values; and
displaying the similarity-based ranked confusion matrix, wherein the distribution of non-zero elements in the similarity-based ranked confusion matrix indicates the accuracy of the classification.

14. An electronic device comprising:
a memory; and
a processor coupled to the memory having therein stored instructions which, when executed by the processor, cause the electronic device to perform the following operations:
generating a similarity-based ranked confusion matrix, which comprises:
based on similarities of K categories of the fuzzy attribute of the object, ranking the K categories of the fuzzy attribute of the object, where K is an integer greater than or equal to 2,
generating a K×K all-zero initialization matrix, which comprises K×K elements $a_{ij}$, where i and j are integers and take values from 1 to K respectively, wherein an abscissa and an ordinate of the initialization matrix respectively represent predicted values of the similarity-based ranked categories of the fuzzy attribute and true values of the similarity-based ranked categories of the fuzzy attribute, and
based on the true values of the category of the fuzzy attribute for multiple object samples and the predicted values of the category of the fuzzy attribute for the multiple object samples, updating values of corresponding elements in the initialization matrix, such that the value of the element in the updated initialization matrix represents the number of object samples with corresponding true and predicted values; and
displaying the similarity-based ranked confusion matrix, wherein the distribution of non-zero elements in the similarity-based ranked confusion matrix indicates accuracy of the classification.

15. A non-transitory computer-readable storage medium having thereon stored a computer program, which, when executed by a processor, implements the method according to claim 1.

16. A device for evaluating an effect of classifying a fuzzy attribute of an object, comprising: means for performing the method according to claim 1.

17. An electronic device comprising:
a memory; and
a processor coupled to the memory having therein stored instructions which, when executed by the processor, cause the electronic device to perform the method according to claim 13.

18. A non-transitory computer-readable storage medium having thereon stored a computer program, which, when executed by a processor, implements the method according to claim 13.

19. A device for evaluating an effect of classifying an attribute of an object, comprising: means for performing the method according to claim 13.

* * * * *